US010656066B2

(12) United States Patent
Sarkar et al.

(10) Patent No.: US 10,656,066 B2
(45) Date of Patent: May 19, 2020

(54) SPRAY CHARACTERIZATION BY OPTICAL IMAGE ANALYSIS

(71) Applicant: ISP Investments LLC, Wilmington, DE (US)

(72) Inventors: Sounak Sarkar, Hillsborough, NJ (US); Surya Kamin, Skillman, NJ (US)

(73) Assignee: ISP Investments LLC, Wilmington, DE (US)

( * ) Notice: Subject to any disclaimer, the term of this patent is extended or adjusted under 35 U.S.C. 154(b) by 180 days.

(21) Appl. No.: 15/557,252

(22) PCT Filed: Mar. 9, 2016

(86) PCT No.: PCT/US2016/021438
§ 371 (c)(1),
(2) Date: Sep. 11, 2017

(87) PCT Pub. No.: WO2016/145000
PCT Pub. Date: Sep. 15, 2016

(65) Prior Publication Data
US 2018/0052088 A1     Feb. 22, 2018

Related U.S. Application Data

(60) Provisional application No. 62/130,300, filed on Mar. 9, 2015, provisional application No. 62/295,668, filed on Feb. 16, 2016.

(51) Int. Cl.
*G06K 9/00*       (2006.01)
*G01N 15/02*      (2006.01)
(Continued)

(52) U.S. Cl.
CPC ....... *G01N 15/0227* (2013.01); *B05B 12/082* (2013.01); *G06T 7/0004* (2013.01);
(Continued)

(58) Field of Classification Search
None
See application file for complete search history.

(56) References Cited

U.S. PATENT DOCUMENTS 7,483,767 B2 * 1/2009 Montaser ............. B05B 12/082
                                                         700/283
7,673,478 B2    3/2010 Krauss et al.
(Continued)

OTHER PUBLICATIONS

Sayyadi et al., "Characterising droplets and precipitation profiles of a fixed spray-plate sprinkler" (Year: 2014).*
Jiang et al., "Measuring particle size distribution using LED-illumination" (Year: 2010).*
(Continued)

*Primary Examiner* — Soo Jin Park
(74) *Attorney, Agent, or Firm* — William J. Davis; Nathalie Tietcheu

(57) ABSTRACT

Optical imaging systems and methods are disclosed herein for investigating and analyzing one or more characteristics of a spray, including spray front velocity, spray sheet length, spray break-up dynamics, drift potential, and drop-size distribution. Optical imaging systems disclosed herein include an image acquisition device, one or more illumination source, a processor for processing and analyzing image data, a background, and a spray system that includes at least a nozzle. The image acquisition device and illumination sources are positioned on the same side of the spray. The processor has a first algorithm to generate a feedback correction factor and a second algorithm to identify droplets and develop a drop-size distribution for the spray. Optical imaging methods for determining spray characteristics are also disclosed and generally include the steps of providing an imaging system, capturing images of the spray with the imaging system, processing the images, and analyzing the images.

11 Claims, 5 Drawing Sheets

(51) Int. Cl.
  *B05B 12/08* (2006.01)
  *G06T 7/62* (2017.01)
  *G06T 7/00* (2017.01)
  *G06T 7/20* (2017.01)
  *G01N 15/00* (2006.01)
  *A01M 7/00* (2006.01)
  *A01M 21/04* (2006.01)
  *B05B 7/26* (2006.01)
  *H04N 5/225* (2006.01)
  *H04N 5/232* (2006.01)

(52) U.S. Cl.
  CPC .................. *G06T 7/20* (2013.01); *G06T 7/62* (2017.01); *A01M 7/0089* (2013.01); *A01M 21/043* (2013.01); *B05B 7/262* (2013.01); *G01N 2015/0026* (2013.01); *G06T 2207/10152* (2013.01); *G06T 2207/30188* (2013.01); *H04N 5/2256* (2013.01); *H04N 5/23203* (2013.01)

(56) References Cited

U.S. PATENT DOCUMENTS

| | | | |
|---|---|---|---|
| 9,098,732 B2* | 8/2015 | Magidow | G06F 3/0482 |
| 10,175,869 B2* | 1/2019 | Magidow | G06F 3/04842 |
| 2007/0047836 A1 | 3/2007 | Pan | |
| 2007/0236693 A1 | 10/2007 | Prociw et al. | |
| 2007/0299561 A1* | 12/2007 | Montaser | B05B 12/082 |
| | | | 700/283 |
| 2009/0060316 A1 | 3/2009 | Ruuska | |
| 2010/0172471 A1 | 7/2010 | Sivathanu et al. | |
| 2013/0296812 A1 | 11/2013 | Bangera et al. | |

OTHER PUBLICATIONS

Bautista-Capetillo et al., "A particle tracking velocimetry technique for drop characterization in agricultural sprinklers" (Year: 2014).*
Sato et al., "Spatial distribution of droplet diameter of wall-impinging-spray for direct injection gasoline engines" (Year: 2003).*
International Search Report, PCT/US2016/021438 published on Sep. 15, 2016.

* cited by examiner

SPRAY CHARACTERIZATION BY OPTICAL IMAGE ANALYSIS

RELATED APPLICATIONS

This application claims the benefits of U.S. Provisional Application No. 62/130,300, filed on Mar. 9, 2015, and U.S. Provisional Application No. 62/295,668, filed on Feb. 16, 2016, each of which are incorporated by reference herein in their entirety.

TECHNICAL FIELD

This application relates generally to systems and methods for measuring and monitoring spray characteristics, in particular systems and methods based on optical imaging-image processing.

BACKGROUND

Spray application is the preferred mode of product delivery in a gamut of industries including coatings and paint, personal care, HI&I, food and beverage, transportation, agriculture, and many others. Accurate measurement of crucial spray characteristics like drop size distribution, coverage, atomization, droplet velocity, drop rebound, and spray drift are important to ensure spray systems meet the delivery and efficacy demands of the application. Sophisticated transmittance-based non-intrusive methods such as laser diffraction (PMS, e.g., Malvern, Sympatec), laser interferometry (PDA, PDPA), pulsed laser backlit-high speed image analysis (PDIA e.g., Oxford VisiSizer, LaVision ParticleMaster), and high-speed videography are most commonly used for spray characterization. Though highly efficient and extremely accurate, the instrumentation can be expensive, complicated to operate, sensitive to drop shape, limited by optical density of spray media, and sensitive to external elements like vibration and temperature, coupled with a very narrow field of view which can restrict wide scale adoption and field deployment of these methods.

The industry requirement of dispensing materials to targets across a myriad of conditions of surface topology, applications, material injection and processes has undoubtedly made spray delivery systems the most universal, versatile, economic and efficient mode of controlled material delivery. In agriculture, the overall quality of pesticide and agricultural sprays generated by varied types of agricultural hydraulic nozzles play a crucial role in determining crop or leaf coverage, active deposition, and most importantly environmental and public health impacts from material translocation and loss arising from off target spray drift, all of which ultimately culminate into the efficacy and sustainability of the spray application processes. Unlike industrial spray applications, accurate real-time evaluation of agricultural sprays in action is further complicated by plant (crop or weed) architecture and dynamics of local meteorological conditions (wind speed, wind direction, humidity and temperature) with the closest approximation to in-field spray performance of nozzles and materials being achieved by wind-tunnel methods under precisely controlled laboratory conditions using strictly laboratory-based spray characterization and analysis equipment.

With the constant rise in concern over off-target spray drift in agricultural applications and significant activity around mitigating the drift problem, closely and accurately monitoring spray characteristics is desirable. Determining nozzle and material influences on spray drift potentials, such as droplet size distribution, droplet velocity distribution and trajectories, volume distribution patterns, spray sheet structures and lengths, entrained air characteristics and structure of individual spray droplets has gained in importance.

SUMMARY

Optical imaging systems and optical imaging methods are disclosed herein for investigating and measuring one or more characteristics of a spray using reflectance based, wide-angle, direct and full-fan optical imaging.

In one aspect, an optical imaging system for determining characteristics of a spray is disclosed that includes an image capturing device, one or more sources of illumination, a processor, optionally a background, and a spray system having a spray nozzle fluidly connected to a pressurized spray container, the nozzle being oriented to produce a spray along one or more planes. The image capturing device may be a digital camera or a digital single lens reflex (DSLR) camera or a mirrorless digital camera employing a CCD or a CMOS type image sensor and capable of having a shutter speed faster than $\frac{1}{100}$ s. The image capturing device can be accessorized with a suitable lens or lens assembly providing a wide field of view. Illumination is provided by at least one source of continuous or pulsed illumination including natural, incandescent, fluorescent, LED light or short duration high intensity flash light with pulse duration within 5-500 μs. The optical imaging system has the image capturing device and the source or sources of illumination on the same side of the spray. The optical imaging system includes a processor where in the processor is a computing device that is one or more of a desktop computer, laptop computer, electronic tablet, smartphone, other mobile device or custom control console. The processor is in communication with the imaging system and is capable of controlling image acquisition by the imaging system and consequent image processing. The image acquisition device operates in a stand-alone mode or is in communication with the processor through a wired, Ethernet, or wireless connection. The source or sources of illumination can be independent of or remotely controlled by or directly linked to camera or the central controller.

In another aspect, system for characterizing a spray is disclosed that includes an imaging system capable of capturing optical images of up to a full fan of the spray, and a processor for processing and analyzing data from the imaging system, the processor having a first algorithm and a second algorithm thereon. The first algorithm is an image processing and analysis algorithm that generates a feedback correction factor through extraction of a plurality of spray characteristics from one or more optical images of the spray. The spray characteristics include a spray sheet length, sheet break-up mechanism, or spray front velocity. The second algorithm is an image processing and analysis algorithm that identifies a plurality of spray droplets from an optical image of a spray fan, extracts a drop-size for each of the plurality of spray droplets, and develops a drop-size distribution from the optical image.

In another aspect, a method of determining a characteristic of a spray is disclosed and includes providing an imaging system that includes a camera, one or more sources of continuous or pulsed illumination, a processor, and an optional background positioned such that the spray is oriented between the background and the camera. The method also includes obtaining one or more optical images of the spray using the imaging system, processing the one or more optical images, and analyzing the one or more optical images to determine the characteristic of the spray. Characteristics of the spray include spray front velocity, spray sheet length, spray break-up dynamics, feedback correction factor, drop-size distribution, drift potential (also called driftable fines) and other characteristics of the spray.

In another aspect, a method for determining a drop size distribution of a spray is disclosed that includes the steps of capturing an optical image of a full spray fan of the spray in an equilibrium condition using an optical imaging system, processing the optical image, identifying a plurality of drops of the spray from the optical image, calculating a Feret diameter for each of the plurality of drops, converting the Feret diameter to an actual drop diameter for each of the plurality of drops by dividing the Feret diameter by a feedback correction factor, and analyzing the actual drop diameters of the plurality of drops to determine the drop size distribution of the spray.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

Figures 3A, 3B, 3C, 3D:
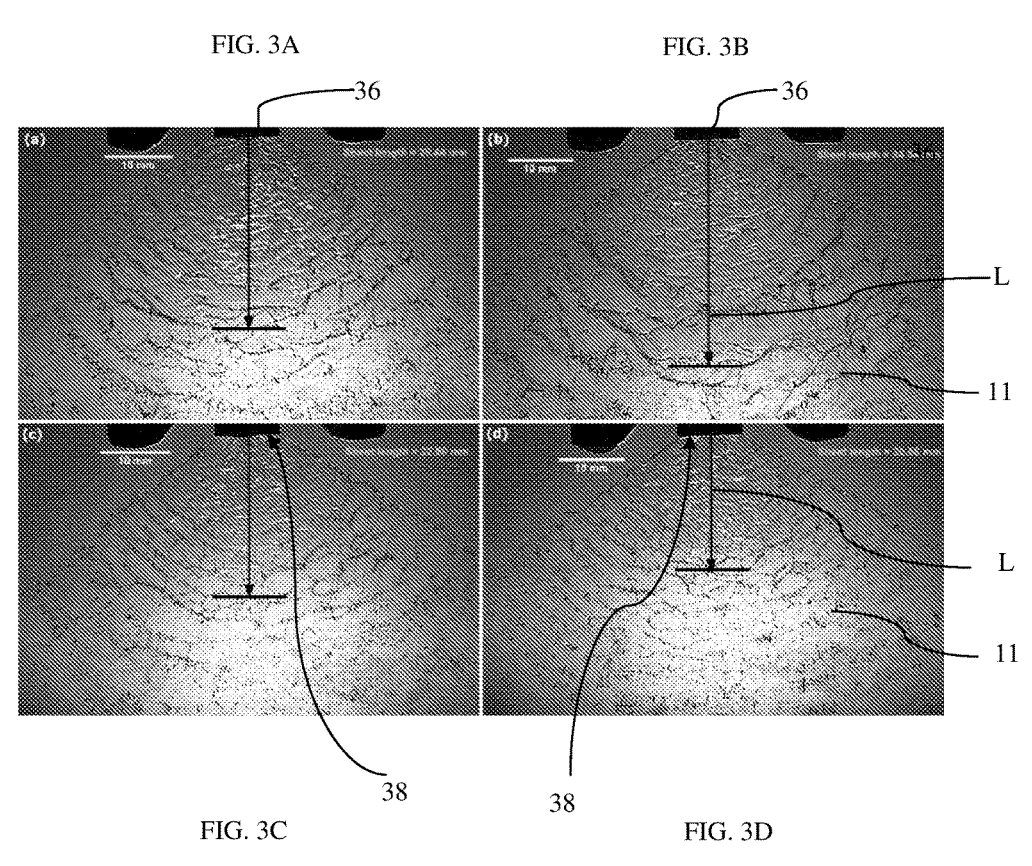

FIG. 3A-3D are optical images of spray sheet portions of spray plumes for four different solutions.

DETAILED DESCRIPTION

Figure 1:
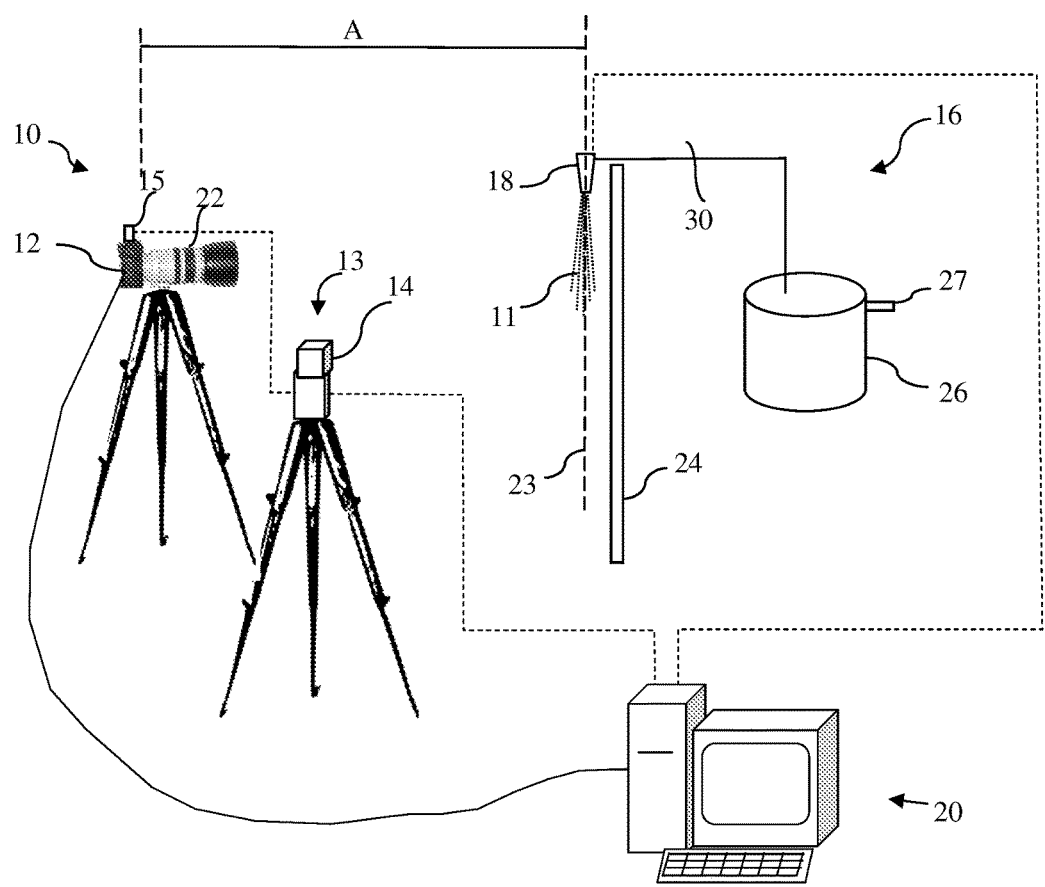
FIG. 1 is a schematic of an image acquisition system disclosed herein.

Reference is now made in detail to the description of various embodiments as described herein. While several embodiments are described in connection with this disclosure, there is no intent to limit the disclosure to the embodiment or embodiments disclosed herein. On the contrary, the intent is to cover all alternatives, modifications, and equivalents.

Existing non-intrusive optical imaging and non-imaging methods for spray characteristics analysis are relatively more popular for analyzing spray characteristics than intrusive sampling methods, since these non-intrusive optical analysis techniques extract critical spray dropsize and velocity information of spray droplets in flight without physically disrupting the spray. In contrast, intrusive sampling techniques generally involve one or more of collecting surfaces, collection cells, charged wire and hot wire methods, which mechanically disrupt the spray in some way.

Examples of existing non-intrusive optical methods for spray characterization include Fraunhofer laser diffraction based Particle Measurement Systems (PMS: Malvern, Sympatec) and pulsed or continuous backlit high speed Particle/Droplet Image Analysis (PDIA: Oxford Visisizer, High speed videography), which both utilize a linear "line of sight" optical bench configuration where the spray interjects between the line of sight of the transmitter and receiver optics. Laser interferometry based Phase Doppler Anemometry (PDA/PDPA), Laser Induced Fluorescence (LIF), or Laser Sheet Imaging/Velocimetry (LSV) use a non-linear optical bench configurations in which the receiver optics are aligned at an angle of $\theta°$ ($0°\leq\theta\leq90°$) to the line of sight of the transmitter optics with the spray interjecting in between the optical transmitter and the receiver. Most, if not all of these techniques allow light from a source of illumination to transmit through the spray and capture data in the form of post-interaction modified light after it has undergone one or more of common optical phenomena of refraction, diffraction, scattering, interference fluorescence, or phosphorescence after interacting with the spray.

The common modes of operations of these non-intrusive optical spray characterization techniques are known to be challenged by several optical or instrumental limitations primarily arising from: (a) narrow Field of View (FOV) ranging from several millimeters in diameter (PMS, PDA) to several $mm^2$ for PDIA up to 10 cm×10 cm area (high speed videography) mandating spraying for longer time and putting the spray nozzle on XY or XYZ traverse systems to generate statistically meaningful data over the entire spray plume; (b) non-spherical drop shape and droplet or spray optical density limiting regions of the spray plume over which drop size analysis can be accurately performed; and (c) defocused drops or ghost images requiring extensive and complicated focus correcting and defocused droplet identification and rejection algorithms.

Disclosed herein are methods and processes involving reflectance-based, wide-angle, direct, full-fan optical imaging and image processing methods for spray characterization. Recent advancements in digital image quality and computational ability allow the use of readily accessible off-the-shelf digital cameras with assistive sources of illumination to characterize spray droplet size distributions. "Reflectance-based" refers to a process by which data is captured in the form of light reflected from the spray with the source of illumination and the image capturing device on same side of the spray. "Wide-angle" refers to the field of view accessible to the image capturing device by virtue of the lens or lens assembly used to capture a spray image. "Direct" refers to capturing spray data as unmodified light reflected from the spray prior to the source light undergoing refraction, diffraction, scattering, interference, fluorescence or phosphorescence due to interaction with the spray. "Full fan" generally refers to an area within the 2-dimensional field of view of the image acquisition device occupied by the propagating spray plume from its origin at the exit orifice of the nozzle to the point at which the spray terminates on a designated target. The full fan of a spray includes greater than about 90% of spray droplets, or more preferably greater than about 95% of the spray droplets. A "partial fan" of the spray generally includes less than the full fan of the spray. A partial fan of the spray can include about 1% to about 95% of the spray droplets, or more preferably about 5% to about 90% of the spray droplets.

Methods are disclosed to determine one or more characteristics of the spray, the characteristics including, but not limited to, spray drop size distribution, drift potential, spray sheet, spray sheet length, spray sheet breakup mechanisms, and spray velocity data from spray optical images. The disclosed optical imaging and image processing methods can be used to compare the effects of different spray nozzles and adjuvants on spray droplet size distributions. Although the disclosure focuses on agricultural spray applications, it is understood that the systems and methods disclosed herein can be used in other spray applications in various industries, including but not limited to, coatings and paint, personal care, HI&I, food and beverage, and transportation. Benefits of the systems and methods disclosed herein include small equipment footprint, low equipment cost, system ruggedness, simplicity in image acquisition and processing algorithms, reliability and precision of data generated, continuous and non-volatile record-keeping for application processes and post-application analysis among others. The disclosed optical imaging systems and methods are field deployable, easy to use, and capable of generating spray pattern analysis and drift potential data along with continuous record keeping capability in real-time during the spray application process.

Referring to FIG. 1, an imaging system 10 is disclosed for conducting optical imaging analysis of spray characteristics. The imaging system 10 generally includes an image acquisition device 12, one or more source(s) of illumination 13, a spray system 16 having at least one nozzle 18, and a control device 20 in electronic communication with the camera 12. The control device 20 may be configured to communicate with one or more other components of the imaging system 10 and/or the spray system 16. The imaging system 10 can also include an optional background 24.

The image acquisition device 12 can include an off-the-shelf, digital camera, digital single lens reflex (DSLR) camera or a mirrorless digital SLR camera employing a CCD-type or CMOS-type image sensor capable of capturing high speed and high definition still images and videos. The camera 12 can have a shutter speed faster than $1/100$ second, more preferably in a range of about $1/200$ second to about $1/4000$ second and can be capable of capturing video images up to or in excess of 60 frames per second. The image acquisition device 10 generally includes one or more commercially available, off-the-shelf lenses or lens assemblies 22, which can provide a wide field of view. Examples of the image acquisition device 12 can include, but are not limited to, a Canon® EOS 6D, 20.2 megapixel Digital SLR camera fitted with a Canon® EF 24-105 f/4L IS USM lens, a Samsung NX3000 mirrorless camera fitted with a Samsung 20-50 mm lens, or other off-the-shelf digital camera. The image acquisition device 12 can be capable of capturing images that include up to the full fan of a spray and/or a partial fan of the spray. The image acquisition device 12 can capture a spray fan in a range of about 1% to about 100% of the spray droplets of a spray in an embodiment, or in a range of about 1% to about 95% of the spray droplets of a spray in another embodiment, or in a range of about 5% to about 90% of the spray droplets of a spray in yet another embodiment.

The image acquisition device 12 may be positioned at a distance A from a plane 23 of the spray 11 with the image acquisition device 12 and the source of illumination 13 on the same side of the spray 11. The image acquisition device 12 can be operated in a stand-alone mode or can be in communication with the control device 20 (e.g., processor) through a wired, Ethernet, or wireless connection to transfer images to the control device 20 and/or communicate with the one or more sources of illumination 13 or flash devices 14. The camera 12 can have a remote flash controller 15 capable of wirelessly communicating with the flash devices 14. The remote flash controller 15 can be mounted on the hot shoe of the camera 12. In one embodiment, the remote flash controller 15 is a Cannon Speedlite Transmitter ST-E3-RT remote radio flash controller.

The illumination sources 13 can include one or more continuous or pulsed illumination sources. The illumination sources 13 can be natural light, incandescent light, fluorescent light, LED light, or one or more flash devices 14, in particular, short duration, high-intensity flash illumination devices. Examples of flash devices 14 can include, but are not limited to, Canon® Speedlite 600EX-RT external flash device, a Yongnuo Speedlite YN560 IV external flash, or other external flash device. The flash devices 14 can be synced to the camera 12 via the remote flash controller 15 as a radio or optical slave (i.e., configured to receive commands or otherwise communicate with the camera 12 via radio or optical signals) or via off-camera hot-shoe replicator cables (i.e., hardwired for electrical communication). In one embodiment, the imaging system 10 includes at least two radio-controlled flash devices 14, which provide pulsed illumination for spray image acquisition by the camera 12. One or more sources of illumination 13 or flash devices 14 can be positioned so that at least one source of illumination 13 or flash device 14 is on either side of the camera 12. The source of illumination 13 or flash devices 14 on either side of the camera 12 are oriented so that illumination generated by them point in a converging plane towards the spray 11. The source of illumination 13 or flash devices 14 can be positioned on the same side of the background 24 and spray 11 as the camera 12 and oriented towards the spray 11.

In another embodiment, the source of illumination 13 can be continuous lighting devices (not shown), which can provide continuous light, such as white light. In one embodiment, the continuous lighting devices can be balanced at 5600 k daylight temperature. Examples of commercially available continuous lighting devices include, but are not limited to, Generay SpectroLED 14 light assemblies, or other light assemblies.

The optional background 24 can be a solid background, such as a solid black or other solid dark colored background. The background 24 can be a non-reflective, absorbent background. The background 24 can be oriented so that a plane of the background 24 is generally perpendicular to the line of sight of the camera 12 and spaced apart from the camera 12. The background can be positioned on a side of the nozzle 18 of the spray system 16 opposite the camera 12 such that the nozzle 18 is disposed between the background 24 and the camera 12. In one embodiment, the background 24 is positioned spaced apart from the nozzle 18 so that the surface of the background 24 does not interfere with the spray 11 from the nozzle 18. In one embodiment, the background 24 is spaced at least 5-6 inches from the nozzle 18.

The background 24 can also be a light diffuser box comprising a volume with at least one translucent surface positioned to face toward the camera 12. The light diffuser box can include a flash device 14 positioned within the light diffuser box and electrically and controllably connected to the camera 12 by a hot-shoe replicator cable. Use of a light diffuser box for the background 24 may provide for back-lighting of the spray images if desired.

The imaging system 10 can also include a length standard positioned in alignment with the plane of the spray 11 facing the camera 12 and within the image area of the camera 12. The length standard can be in metric units or other units of measure and can be utilized by the imaging software to facilitate conversion of pixels to length for each of the captured images.

Still referring to FIG. 1, the spray system 16 generally includes a tank 26 having an air inlet 27 to hold the fluid to be sprayed, the nozzle 18, and pressure tubing and hoses to connect the tank 26 to the nozzle 18 and air inlet to an air supply with the pressurization of the tank 26 by air or exit of spray fluid to nozzle 18 controlled by set of valves which can be operated manually or electronically or electromechanically from the control system 20 or from a different control system (not shown). The tank 26 and nozzle 18 are fluidly coupled by the pressure tubing and/or hoses to define a fluid pathway 30. The tank 26 can be a pressurized spray fluid container, and pressurized air can be connected to the air inlet 27 of the tank 26 to deliver the fluid, under pressure, to the nozzle 18. In one embodiment, the nozzle 18 can be positioned such that the spray 11 is oriented downward towards the ground or floor. The nozzle 18 can be oriented so that the spray broad plane 23 is aligned generally parallel to the plane of the background 24 and generally perpendicular to the line of sight of the camera 12. Other spray patterns may also be analyzed using the systems and methods disclosed herein. Examples of nozzles 18 suitable for use with the spray system 16 include, but are not limited to, Flat-fan XR11003 nozzle or Flat-fan XR11004 nozzle (both made by TEEJET®) or other equivalent nozzle.

The control device 20 can be a computer used to control the image acquisition setup and or the spray system, receive the digital photographs and videos from the camera 12, perform image processing and data extraction functions, conduct video editing and video processing, data handling, and perform statistical analysis and calculations to characterize the spray. As used herein "computer" means computers, laptop computers, controllers, processors, computer components and elements of a computer, such as hardware, firmware, virtualized hardware and firmware, combinations thereof, tablet computers, mobile devices, smart phones, or software in execution. One or more computers can reside in or on a server in various embodiments and the server can itself be comprised of multiple computers. One or more computers can reside within a process and/or thread of execution, and a computer can be localized at one location and/or distributed between two or more locations.

The computer can include a memory, a processor, and a user interface (which can include, for example, a keyboard, mouse or other cursor control device, joystick, touchscreen, or other input devices, screen/monitor, printer, etc.) to receive inputs from, and provide outputs to, a user. The computer can be operatively coupled to a database which can store information relating to the identity of and information relating to the sequence of events and control commands, identification of image and video files and events, image or video processing algorithms, spray characteristic data generated from spray image or video processing, and operating conditions of the camera, for example. As used herein "database" means any of a number of different data stores that provide searchable indices for storing, locating and retrieving data, including without limitation, relational databases, associative databases, hierarchical databases, object-oriented databases, network model databases, dictionaries, flat file/XML datastores, flat file systems with spidering or semantic indexing, and the like. Alternately, or in addition, the same information can be stored in the memory of the computer, which can also be considered a database.

Various information, including but not limited to the identity of and information relating to the events and acquired image and videos can be stored on software stored in the memory and/or the processor. The software may be able to be read/processed/acted upon by the processor. As used herein, "software" means one or more computer readable and/or executable instructions or programs that cause a computer/processor/device to perform functions, actions and/or behave in a desired manner. The instructions may be embodied in various forms such as routines, control commands, algorithms, modules, methods, threads, and/or programs. Software may also be implemented in a variety of executable and/or loadable forms including, but not limited to, stand-alone programs, function calls (local and/or remote), servelets, applets, instructions stored in a memory, part of an operating system or browser, bytecode, interpreted scripts and the like. It should be appreciated that the computer readable and/or executable instructions can be located on one computer and/or distributed between two or more communicating, co-operating, and/or parallel processing computers or the like and thus can be loaded and/or executed in serial, parallel, massively parallel and other manners. It should also be appreciated that the form of software may be dependent on various factors, such as the requirements of a desired application, the environment in which it runs, and/or the desires of a particular designer/programmer. The software may be stored on a tangible medium, such as memory, on a hard drive, on a compact disc, RAM memory, flash drive, etc., which tangible medium can exclude signals, such as transitory signals and/or non-statutory transitory signals.

The various functions described above may be provided or contained in its own module. Each module can be a block of software, code, instructions or the like which, when run on a computer, provide the desired functions. Each module may be able to interact with the other modules, and may not necessarily be discrete and separate from the other modules, the reader, or other components of the reader/system. The modules in the system may be functionally and/or physically separated, but can share data, outputs, inputs, or the like to operate as a single system and provide the functions described herein.

Various commercially available software packages can be installed on the computer 20 for the purpose of processing and analyzing the optical image data collected via the camera 12. In an embodiment, the computer 20 can have ImageJ and associated plugins, or other equivalent software, installed thereon for conducting image processing and data extraction operations. Commercially available video editing and processing software can be used to process and extract data from spray videos. In an embodiment, Microsoft Excel and OriginPro Statistical and Graphing software can be used for data handling and statistical analysis.

Methods for determining one or more characteristics of a spray using the imaging system 10 are disclosed herein and generally include the steps of providing an imaging system as disclosed herein, capturing one or more optical images of the spray, processing the optical images, and analyzing the images. The spray for a specific fluid can be characterized by parameters including but not limited to spray velocity, spray sheet length, spray sheet break-up mechanism, drift potential, and spray drop size distribution.

A method for determining the spray velocity of a test sample fluid generally can include the steps of providing a test sample fluid, providing an imaging system as disclosed herein, capturing video of the initiation of the spray, segmenting the video into stacks of individual time-stamped frames, removing background and enhancing the signal-to-noise ratio of the image stacks, converting pixels to millimeters for each frame of each image stack, tracking the spray front positions and distances traversed by the spray front between each frame, and calculating an average spray front velocity. Capturing the video can further include positioning the camera at a fixed distance A from the plane of the spray, with the focus of the camera lens adjusted to the plane of the spray, setting the camera to take video at a specified frames per second, initiating recording of video, initiating the spray, and stopping the video after an elapsed time.

Figure 2:
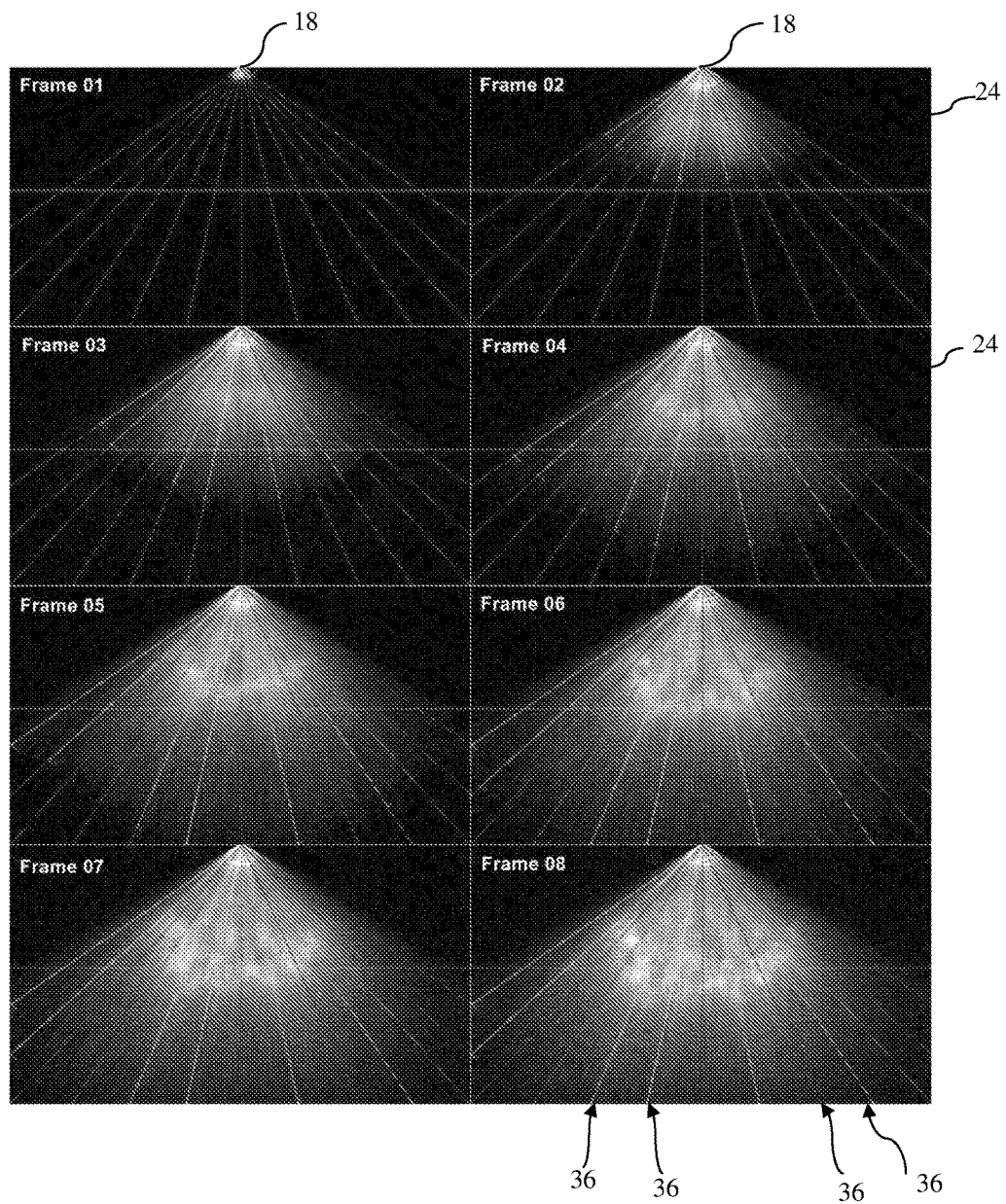
FIG. 2 is a series of optical images of a propagating spray front during spray initiation, the images extracted from video of the full spray fan taken against a solid dark background and background digitally removed.
Figure 4A:
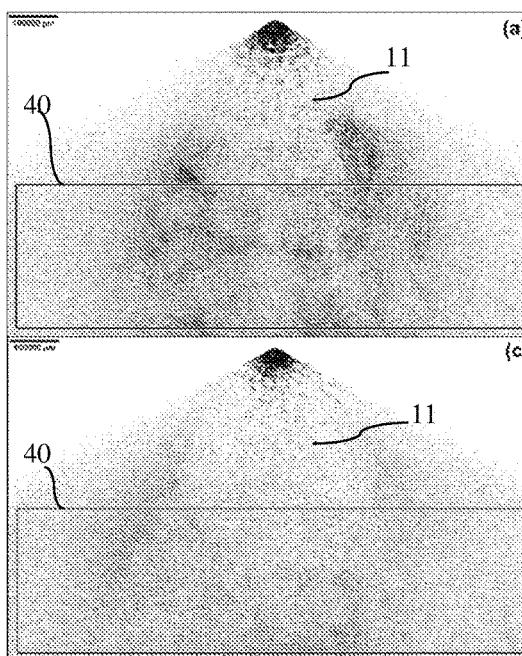
FIG. 4A-4D are optical images of the full spray fans for four different solutions, the optical images having the backgrounds removed using imaging software.
Figure 4B:
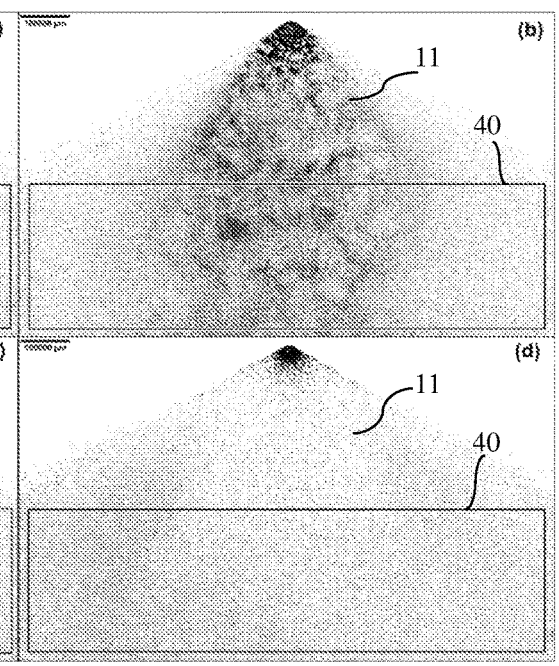
Figure 4C:
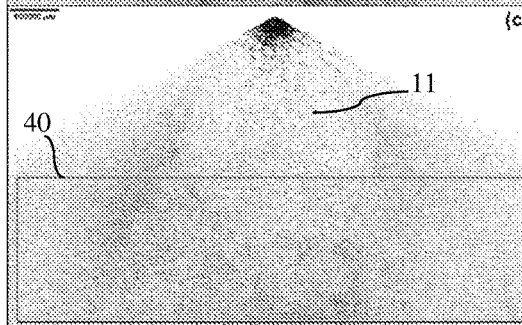
Figure 4D:
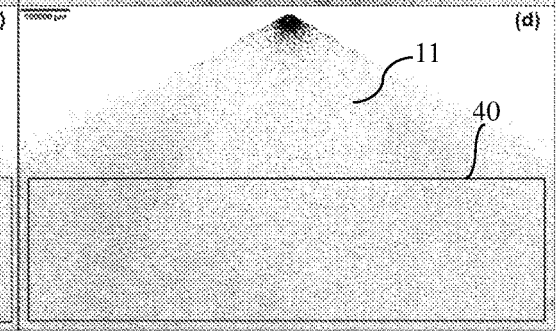

The photographs in FIG. 2 show the progression of the spray front 32 from the nozzle 18 downward, relative to the page on which the photographs are printed. Conversion of pixels to millimeters, or other units of length, can be facilitated by placing a standard length from the metric scale in the plane of the spray. The spray front 32 and distances traversed by the spray front 32 can be tracked simultaneously along pre-drawn guidelines 36 originating from the end of the nozzle and diverging to the extremities of the spray fan. The instantaneous spray front velocity (V) for each tracking point can be calculated by the following Equation 1:

$$V\left(\frac{mm}{s}\right) == \frac{\text{Spray front distance between consecutive frames (mm)}}{\text{Frames per second}} \quad \text{(Eq. 1)}$$

Spray velocities V calculated using Equation 1 can be averaged together for a specific tracking point and/or for a specific region of interest.

A method for determining the sheet length L (FIG. 3B) or break-up point is disclosed that includes the steps of providing a test sample fluid, providing an imaging system having a camera system and a spray system as disclosed herein, establishing a constant spray at equilibrium, capturing one or more still images of the spray sheet exiting the nozzle 18 to create an image stack, converting pixels to length (e.g., millimeters) for each image in the image stack, and measuring the spray sheet length for each image/frame. As shown in FIGS. 3A-3D, the spray sheet length L is a linear distance from the end 38 of the spray nozzle 18 vertically downward to a point beyond which a complete breakup of the spray sheet is achieved. The spray sheet lengths L for each of the images can be averaged together to get an average sheet length $L_{av}$. The step of providing an imaging system 10 can include positioning the camera 12 at a distance from the nozzle 18, providing a source of uniformly diffused illumination (light diffuser box) behind the nozzle 18 such that the nozzle 18 is between the camera 12 and the source of uniformly diffused illumination (light diffuser box), placing a metric scale on plane of the spray, placing an external flash device 14 inside of the light diffuser box, and/or connecting the external flash device 14 to the camera 12 via a hot-shoe replicator chord. The external flash device 14 can be set for high intensity very short duration (5-10 µs) flashes. The spray is initiated and allowed to come to equilibrium before capturing the images.

The average sheet length $L_{av}$ of a test sample can be used to calculate a ratio R of the average sheet length $L_{av}$ of the test sample to the average sheet length of water $L_{avw}$ (or other reference composition) by equation 2.

$$R = \frac{L_{av} \text{ of Test Sample (mm)}}{L_{avw} \text{ of Water (or other reference composition)(mm)}} \quad \text{(Eq. 2)}$$

The average sheet length of water $L_{avw}$ can be determined by performing the method for determining the average sheet length under the same conditions and using water (or other reference composition) as the test sample fluid. The average sheet length ratio R for the test sample can be used in calculating a feedback correction factor for use in determining the drop size distribution as described below.

A method for further characterizing the drop-size distribution of a spray involves optical imaging of the full spray fan. A process for capturing an optical image of the full spray fan includes the steps of providing the test sample fluid, providing an imaging system 10 as disclosed herein, capturing an image of the background without actuation of the spray, actuating the spray and allowing the spray to come to equilibrium, and capturing a single optical image of the full spray fan with the imaging system 10. The process of capturing a pair of optical images—one being the background and the other including the spray—can be repeated a plurality of times to generate an image stack for each test sample fluid. For drop-size distribution, the imaging system 10 can be set-up in a shutter priority mode or in a flash priority mode with comparable results. The camera 12 is oriented parallel to the plane of the spray with the line of sight of the camera 12 aligned generally perpendicular to the plane of the spray. The camera 12 is positioned so that the focal point of the camera 12 is positioned precisely to the plane of the spray. Optical images of the full spray fan are collected using the above process and used for determining the drop-size distribution of the test sample fluid spray.

The images in pairs—background and spray—can be loaded as image stacks into the image processing software, such as ImageJ. Pixel to millimeter (or other length such as microns) conversions for each frame in the image stack is performed using the length standard 25 placed in the plane of the spray. The image processing software is used with the background optical images in the image stack to remove the background from the optical images of the spray fan in order to extract just the full fan wide angle spray pattern in RGB color space. The images are then converted to binary color space for further analysis. An optional modified Watershed algorithm can be applied to the binary spray images to separate overlapping droplet images. A rectangular region of interest (ROI) extending from about 1 foot vertically below the nozzle end to about 2 feet below the nozzle end can be selected to ensure complete spray atomization, and all of the droplet images within this ROI are analyzed using imaging software (e.g., the ImageJ Particle Analysis algorithm) to output a list of Feret diameters ($d_f$) of all droplet images irrespective of their size or circularity. The data can be output from the image processing software as a text file.

In one embodiment, the binary spray images are divided into different areas: 1) the spray full area, which is the entire spray area between 1 foot and 2 feet in height below the spray nozzle; 2) the spray grid in which the entire spray fan image from below the nozzle up to the bottom of the spray fan can be divided in plurality of square regions of uniform area in the form of a grid. The minimum Feret diameter of each of the drops within each of the selected area can be measured using the imaging software, for example the "Analyze Particles" command in ImageJ. The output list of minimum Feret diameters can then be exported as a text file.

The text file of Feret diameters (or minimum Feret diameters) can be imported into an analysis software, such as OriginPro. The droplet Feret diameters extracted from the full fan spray images reflect a combination of instrumental artifact viz motion blur due to camera limitations and intrinsic material characteristics of the sprayed test solutions. Conversion of Feret diameters $d_f$ to actual droplet diameters D is achieved by dividing the Feret diameters $d_f$ by a sample feedback correction factor $C_s$ as per Equation 3.

$$D = d_f / C_s \quad \text{(Eq. 3)}$$

The sample feedback correction factor $C_s$ is the product of the ratio R (See Eq. 2) and a water factor $F_w$, which is a numerical value obtained as the product of average spray front velocity of water $V_{avw}$ and the exposure time, which, in one embodiment, was $\frac{1}{4000}$ s for operation shutter priority mode (Equation 4). The average spray front velocity of water $V_{avw}$ is determined at the same operating conditions as the test sample. It is understood that the exposure time can vary depending on the camera and the source of illumination used in the imaging system and the settings available.

$$F_w = (V_{avw}) \times \frac{1}{4000} \quad \text{(Eq. 4)}$$

Figure 5:
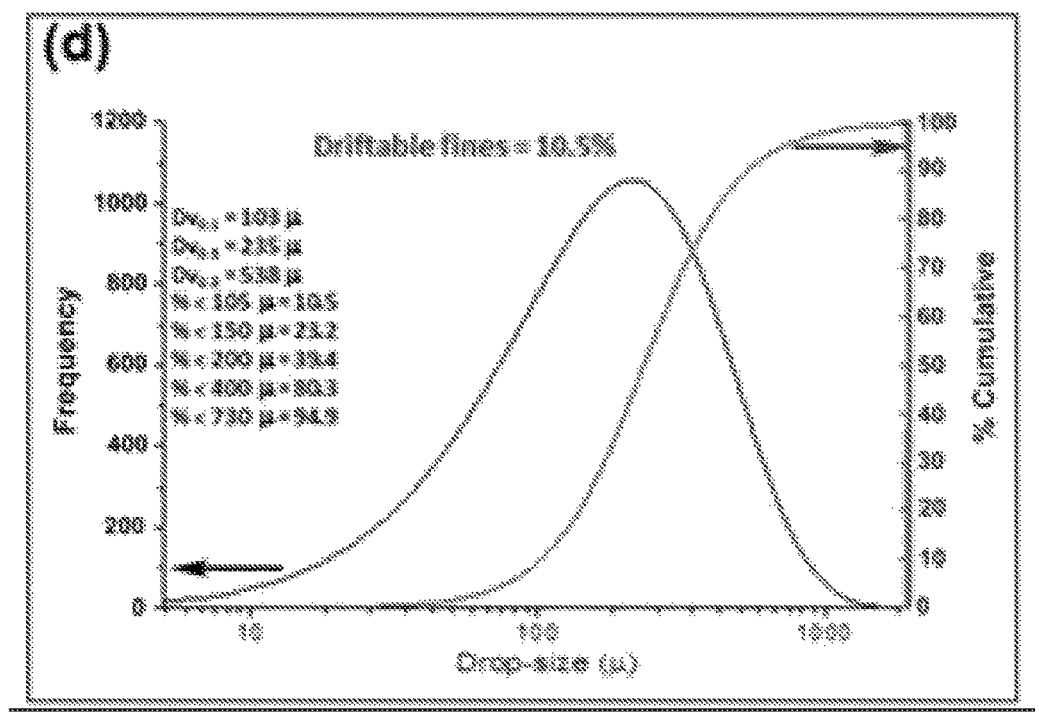
FIG. 5 is a graph illustrating an example of a drop size and dropsize distribution resulting from the disclosed optical imaging methods.

In one embodiment, the water factor $F_w$ is 2. A Droplet Side Distribution (DSD) can be plotted by performing histogram analysis on the corrected minimum Feret diameter data (actual diameter) and overlaying a normal distribution function on the histogram. Additionally, the corrected diameters of all droplets detected and measured in the ROI of each binary spray image can be statistically binned in 400 size-bins from 5 microns to 2000 microns with a 5 micron increment in the bin size to obtain drop-size frequency and cumulative % for each image. A non-linear curve fitting algorithm is applied to the drop-size frequency vs. drop-size data to obtain a frequency distribution curve. An example of a frequency distribution curve is shown in FIG. 5. For the curve in FIG. 5, the drop-size vs. cumulative % data from the statistical binning was fitted to Equation 5 to generate the Cumulative % curve with at least 95% goodness of fit, where $A_1$ and $A_2$ are the fixed lower and upper limits of respectively 0 and 100, $x_0$ is the x-value at y=50 and p is the power set as a dynamic variable.

$$y = \frac{A_1 - A_2}{1 + \left(\frac{x}{x_0}\right)^p} + A_2 \quad \text{(Eq. 5)}$$

From the fitted % Cumulative curve thus obtained, spray drop-size distribution parameters $Dv_{0.1}$, $Dv_{0.5}$ (Volume Mean Diameter or VMD), $Dv_{0.9}$, % fines<105u (occasionally termed as driftable fines), 141u, 150u, 200u, 210u, 400u and 730u can be extracted. Differences in internal characteristics of the test sample material, nozzle design, operating conditions, and software may influence the selection of an equation to model the drop-size distribution. Therefore, it is understood that a curve-fitting algorithm may find equations other than an equation in the form of Equation 5 that best fit the data.

The optical imaging systems 10 disclosed herein can be used to measure and monitor plurality of spray parameters and characteristics during the spraying process for many different spray applications including but not limited to spray applications in the fields of agriculture, Household Industrial and Institutional (HI&I), personal care, automotive, coating and paint industries, food and beverage industries and pharmaceutical and medicine industries. Of particular interest are agricultural sprays and medical/personal care aerosols for which precise metering and controlled dosage of active ingredients through sprays are crucial to spray efficacy. In one embodiment, continuous monitoring of agricultural spray characteristics during application by the optical imaging system disclosed herein can be used to maintain spray efficacy while reducing pesticide/herbicide usage and generation of driftable fine spray particles, both of which may help mitigate risks to neighboring crops, human populous, marine and other ecosystems from pesticide containing fine spray particles drifting off-target during a field application of agricultural sprays.

The optical imaging systems 10 disclosed herein can be integrated in to a fully autonomous spray management system to regulate release of spray materials into the environment. Data generated from spray image acquisition and analysis by the optical imaging system including but not limited to data on spray sheet length, spray front velocity, spray drop size distribution or any combination of those can be used in a feedback loop to automatically trigger signals to valves or regulators anywhere in the path of fluid flow between the spray tank and the spray nozzle to render dynamic control of fluid release as spray.

Operation of the optical imaging systems and methods disclosed herein for characterizing a spray are further described in the following non-limiting examples.

Example 1

Spray front velocities for water were determined using the imaging system disclosed herein and the results compared against published spray front velocities for water. Tap water at ambient room temperature was used as the test sample fluid. Low speed spray videography and spray front velocimetry were used.

Test sprays for imaging were actuated in the laboratory in a fume-hood from a Dayton 0.5 m³ volume spray paint tank connected to a Flat-fan XR11003 or XR11004 nozzles with suitably pressure-rated tubing and compressed air at 40 psi. The vertically downward directed sprays under the influence of no concurrent wind were imaged against a solid black, non-reflective, absorbent background with a metric scale placed in the plane of the sprays for dimension calibration for spray video.

High definition (HD) low speed spray videos were captured at 60 frames per second. The focal plane of the camera was placed 4 feet in front and parallel to the spray plane with the focus of the camera lens manually and precisely adjusted to the plane of the spray. Video recording was initiated 1 second before actuation of the test sprays. For each test sample approximately 4 seconds of video was captured. Using suitable video processing software, the spray videos were sliced in to stacks of individual image frames. Background removal and signal-to-noise enhancement of the image stack was performed using suitable ImageJ functions and plugins (FIG. 1). Pixel to millimeter conversion for each frame in the image stack was performed using standard lengths from the metric scale placed in the plane of the spray. Spray front positions and distances traversed by the spray front between each frame were tracked simultaneously along pre-drawn guidelines originating from the end of the nozzle and diverging to the extremities of the spray fan (FIG. 1). Knowing the interval between consecutive frames to be $\frac{1}{60}$th second or 0.0166 second, the instantaneous spray front velocity V for each tracking point was calculated by the formula described in Equation 1: V (mm/s)="Spray front distance between consecutive frames (mm)"/(0.0166 (s)).

For the purpose of this work, the average of all velocities tracked within a region of interest (ROI) extending from 1 foot below the level of the spray nozzle up to 2 feet below the level of the spray nozzle were averaged for each sample and used as the average spray front velocity $V_{av}$.

The detailed analysis result of spray front velocimetry obtained by tracking the progress of the spray front for water sprayed through a XR11004 nozzle at 40 psi is shown in Table 1. The Track ID represents each of the guide-lines along which the movement of the spray front was tracked and number of points at which the spray front velocity was tracked along each guide-line are shown in the second column of Table 1. The minimum spray front velocity for each track was recorded right after the spray exited the nozzle and within 20-30 mm from the nozzle exit. Within this short distance a major part of the spray still existed as spray sheet and thus would not have appropriately represented a completely atomized spray. The maximum spray front velocity for each track was recorded further down within a distance of 230-250 mm (~10 inches) vertically below the nozzle exit. At this distance it was safely assumed that atomization of the spray sheet was complete and hence the maximum spray front velocity for each track was considered as better representative of the terminal spray velocity along the respective track. The average of the maximum spray front velocities recorded for each track was thus considered to be the representative Average Spray Front Velocity $V_{av}$ for the material sprayed.

TABLE 1

Spray front velocity from videography of tap-water sprayed through XR11004 nozzle under 40 PSI pressure.

| Track ID | No. of Points | Track Duration (s) | Track Length (mm) | Minimum Velocity (minis) | Distance (mm) | Maximum Velocity (mm/s) | Distance (mm) |
|---|---|---|---|---|---|---|---|
| 1 | 6 | 0.080 | 461.72 | 1535.71 | 24.57 | 8000.00 | 248.00 |
| 2 | 6 | 0.080 | 473.12 | 1597.19 | 25.55 | 7670.26 | 243.23 |
| 3 | 6 | 0.080 | 472.91 | 1681.23 | 26.90 | 8154.28 | 251.08 |
| 4 | 7 | 0.096 | 503.86 | 1646.35 | 26.34 | 7231.24 | 243.63 |
| 5 | 7 | 0.096 | 506.96 | 1804.90 | 28.87 | 7673.17 | 243.37 |
| 6 | 8 | 0.112 | 553.30 | 1822.83 | 29.16 | 6983.31 | 239.33 |
| 7 | 8 | 0.112 | 552.66 | 1208.50 | 25.84 | 7270.64 | 238.69 |
| 8 | 8 | 0.112 | 619.17 | 1667.52 | 26.68 | 7005.56 | 236.39 |
| 9 | 8 | 0.112 | 615.26 | 1747.08 | 27.95 | 7210.13 | 236.81 |
| 10 | 7 | 0.096 | 531.91 | 1723.93 | 27.58 | 7446.15 | 238.11 |
| 11 | 7 | 0.096 | 526.86 | 1557.16 | 24.91 | 7847.80 | 247.49 |
| 12 | 6 | 0.080 | 471.32 | 1788.93 | 28.62 | 8037.94 | 233.98 |
| 13 | 6 | 0.080 | 465.23 | 1568.18 | 25.09 | 7416.54 | 235.58 |
| Average Maximum Spray front velocity | | | | | | 7534.39 | |

The average spray front velocity of water $V_{avw}$ extracted from the current spray video velocimetry closely matched with droplet velocity of water sprayed under similar conditions of pressure through nozzles generating droplets of identical VMD and measured with sophisticated Phase Doppler Particle Analyzer (PDPA) and Oxford Visisizer equipment as reported in the following: 1) Miller, P. C. H., Tuck, C. R., Murchy, S. and Ferreira, M. da-C., "Measurement of Droplet Velocities in Sprays Produced by different Designs of Agricultural Nozzle," presented at the 22nd European Conference on Liquid Atomization and Spray Systems, Como Lake, Italy, Paper ID ILASS-8-5, (2008); and 2) Miller, P. C. H. and Butler Ellis, M. C., "Effects of Formulation in Spray Nozzle Performance for Applications from Ground-Based Boom Sprayers," Crop Prot., Vol. 19, 2000, pp. 609-615, both of which references are incorporated herein by reference in their entirety. Droplet velocities are generally understood to be dependent on droplet size, and smaller droplets tend to decelerate faster than larger droplets.

The velocity of droplets in the size range of VMD of a spray can be safely assumed as the weighted average velocity of all droplets in a spray plume. Hence a close match of spray front velocity obtained from low speed spray videography and from PDPA or Visisizer for water under spraying conditions generating identical VMD can be considered as validation of the spray video velocimetry technique as a fairly accurate and reliable method to determine average spray droplet velocities.

Example 2

Spray front velocities were studied for different spray test solutions. Tap water at ambient room temperature was used as the standard for all calibration and standardization purposes. Spray test solutions were prepared using commercially available loaded Potassium Glyphosate (48.7% Glyphosate salt) and used as received at a manufacturer recommended dose of 1 quart/10 gallons. Leading emulsion-based commercial drift control agent (Commercial 01) was obtained from manufacturer and used as received for spray drop-size control using standard wind-tunnel and newly developed optical imaging methods against Ashland's proprietary novel Multifunctional Drift Control Agent (M-DCA) at use levels ranging from 4 Ounces/acre to 6 Ounces/acre as recommended by manufacturers. The spray front velocities for each test solutions were determined using the imaging system and methods described above for Example 1. Table 2 shows the average spray velocity data obtained using above-mentioned low speed spray videography—spray front velocimetry as a function of type of materials sprayed.

TABLE 2

Comparison of average maximum spray front velocity ($V_{av}$) for different spray test samples

| Sample Type | Test Material | Operating Pressure (psi) | Spray Nozzle | Average Maximum Spray Front Velocity $V_{av}$ (mm/s) |
|---|---|---|---|---|
| 1 | Tapwater | 40 | TeeJet XR11004 | 7534.4 |
| 2 | Herbicide in Tapwater | 40 | TeeJet XR11004 | 9032.1 |
| 3 | Herbicide + Emulsion DCA in Tapwater | 40 | TeeJet XR11004 | 12108.6 |

Not intending to be limited by theory, the observed variations in average maximum spray front velocities with variation in the nature or compositions of the test spray samples may be attributable to variability in the average drop-size and the static surface tensions of the test spray solutions. Generally larger drops decelerate slower that the finer drops. Thus a spray plume consisting mostly of comparatively larger drops or biased towards a larger drop-size distribution, as a whole, may appear to move faster than a spray plume consisting finer drops or biased towards a smaller drop-size distribution. The intrinsic differences in test spray materials that affected the spray velocities measured by spray front velocimetry of low-speed spray videos were also found to influence the spray sheet breakup process as is discussed in the subsequent discussion of Example 3.

Example 3

Spray Sheet Breakup Dynamics, including sheet length, for sprays of four test sample solutions were studied. The four test samples included: (1) water; (2) water and herbicide solutions; (3) herbicide solutions with an emulsion based on DCA commercial 01; and (4) the herbicide solution with emulsion based on Ashland M-DCA.

Test sprays for imaging were actuated in the laboratory in a fume-hood from a Dayton 0.5 m$^3$ volume spray paint tank connected to static Flat-fan XR11003 or XR11004 nozzles with suitably pressure-rated tubing and compressed air at 40 psi. The sprays were directed vertically downward under the influence of no concurrent wind.

Images captured for the study of spray sheet breakup mechanisms were made using a modified diffused back-lit high-speed optical imaging technique as described herein. The focal plane of the camera was placed 3 feet in front of and parallel to the spray fan with the lens precisely focused on a region of interest (ROI) approximately 90 mm wide and 50 mm high on the actuated spray including the lower part of the nozzle assembly with the focus of the camera lens precisely adjusted to the plane of the spray as described in Example 1. The spray nozzle was placed 4 inches in front of a custom-built light diffuser box and a metric scale was placed in the plane of the spray. The only illumination for the spray sheet images were obtained from an external flash placed in the light box, connected to the camera via off camera hot-shoe replicator chord. The flash was set for controlled generation of spikes of high intensity very short (5-10 μs) duration flashes. The spray was actuated at 40 PSI pressure and allowed to reach equilibrium for 3-4 seconds. A series of 24 images of the spray sheet coming out of the nozzle were shot continuously at 8 frames per second at a shutter speed of 1/200. Pixel to millimeter conversion for each frame in the image stack was performed using standard lengths from the metric scale placed in the plane of the spray. Spray sheet lengths were measures for each image as the linear distance from the end of the nozzle vertically downwards to a point beyond which a complete breakup of the spray sheet is achieved (the distance being marked by an arrow). The spray sheet lengths were averaged over the 24 frames to obtain the average sheet length $L_{av}$ for each test sample. The ratio R of average spray sheet lengths for test sample to that of water was calculated from these data using Equation 2.

Representative spray sheet images made using high-speed flash backlit imaging for the four test samples are shown in FIGS. 3A-3D, and the average spray sheet lengths $L_{av}$ for each spray sample, calculated from these images and provided in Table 3 below, show distinct qualitative and quantitative differences in the modes of spray sheet formation and breakup for different spray materials.

TABLE 3

Comparison of spray sheet lengths

| Spray Parameters | Sample | | | |
|---|---|---|---|---|
| | Water | Herbicide | Commercial 01 in Herbicide | Agrimer M-DCA in Herbicide |
| Average Sheet Length ($L_{av}$) (mm) | 28.46 | 34.34 | 22.88 | 20.67 |
| Sheet length ratio ($R_{sample}$) | 1.000 | 1.206 | 0.804 | 0.726 |
| Sample Feedback Correction Factor ($C_S$) | 1.88 | 2.27 | 1.51 | 1.36 |

Figure 6:
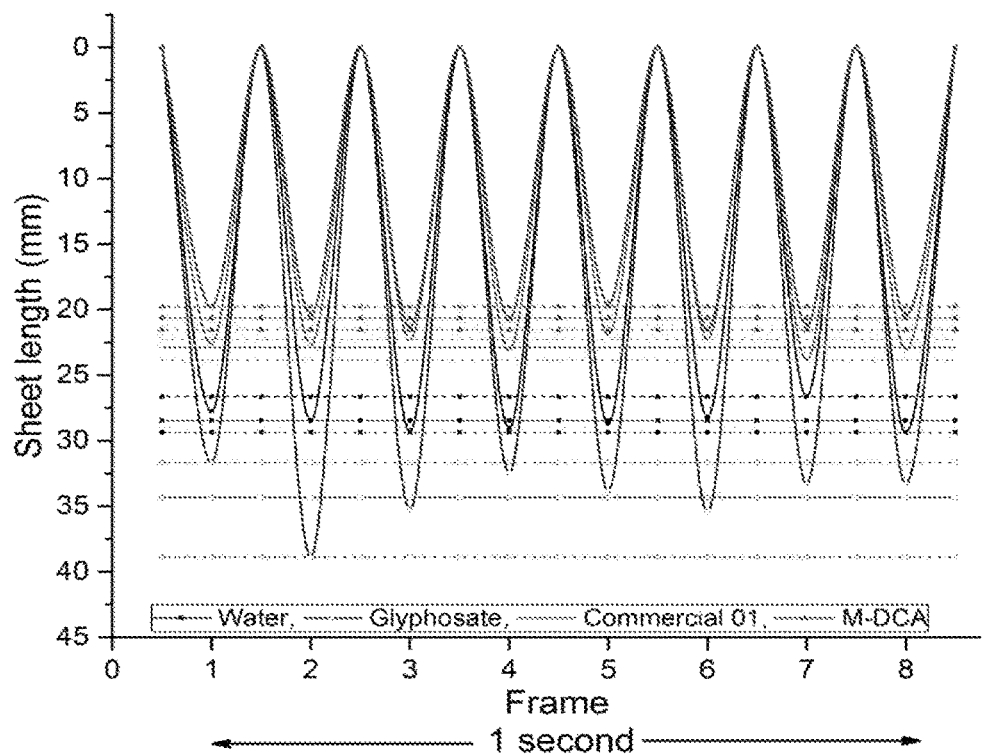
FIG. 6 is a graph showing time evolved spray sheet length variations of four different solutions.

Comparison of the time-evolved variations in sheet lengths over 8 consecutive spray sheet length images captured within a continuous duration of 1 second for the test spray samples was undertaken. Referring to FIG. 6, each frame of sheet length in FIG. 6 was an average of the nth (n=1-8) sheet length for 3 sets of 8 images of 1 s bursts (8 frames/s). It was observed that both water and herbicide solutions showed not only significantly longer sheet lengths but also a wide variation in sheet lengths even within a period of 1 s. On the other hand, test solutions containing emulsion-based DCAs in herbicide solutions showed in general a much smaller sheet length and a greater uniformity in the spray sheet lengths with narrower differences between the longest and shortest sheet lengths within a time frame of 1 s. Thus, it was concluded that the optical imaging systems and methods disclosed herein are able to capture minute but crucial details of aspects controlling spray sheet formation and subsequent break up mechanisms. The spray sheet lengths, spray sheet breakup mechanisms, and time-evolved sheet length variations can influence the spray drop-size distribution of the test spray solutions.

Example 4

Full fan spray imaging and drop size distribution characterization was performed on sprays of four test sample solutions. The four test samples included: (1) water; (2) water and herbicide solutions; (3) herbicide solutions with an emulsion based on DCA commercial 01; and (4) the herbicide solution with emulsion based on Ashland M-DCA.

Test sprays for imaging were actuated in the laboratory in a fume-hood from a Dayton 0.5 m$^3$ volume spray paint tank connected to static Flat-fan XR11003 or XR11004 nozzles with suitably pressure-rated tubing and compressed air at 40 psi. The vertically downward directed sprays under the influence of no concurrent wind were imaged against a black background with a metric scale placed in the plane of the sprays for dimension calibration for full fan spray images.

Spray images of the full spray fan were captured for drop-size distribution characterization either in a shutter priority mode or in a flash priority mode with comparable results. In both cases the focal plane of the camera was placed 4 feet in front of and parallel to the plane of the spray, and the focus was adjusted precisely to the plane of the spray fan. as described in Example 1. In shutter priority mode, the images were captured at a shutter speed of 1/4000 s. Two radio controlled external flashes were set in radio slave mode at highest power at a distance of approximately 4 feet from and in front of the spray fan and triggered at first curtain with a radio-controller synced to the camera. In flash priority mode, the images were captured at a shutter speed of ½₀₀ s. A single external flash unit set in manual mode at a fraction of maximum power output was placed approximately 2 feet from and in front of the spray and triggered via an off-camera hot-shoe replicator chord from the camera at first curtain of shutter release. The results obtained from using the optical imaging system in shutter priority mode are presented herein, but comparable results were obtained by utilizing the optical imaging system in flash priority mode.

For each spray image, an image of the background without actuation of the spray was collected using exactly the same camera and flash settings as that of the spray image. The spray was actuated at a pressure of 40 PSI and allowed to achieve equilibrium for 4 seconds after which a single image of the full fan of the spray was captured. The process was repeated at least 12-15 times for each test sample and standard tap water sprays to generate an image stack for each test sample.

Using ImageJ image processing software, the corresponding background for each spray image was electronically removed from the later to extract just the full fan wide angle spray pattern in RGB color space and then converted to binary color space for further analysis. Pixel to millimeter conversion for each frame in the image stack was performed using standard lengths from the metric scale placed in the plane of the spray. A modified Watershed algorithm was implemented on the binary spray images to separate overlapping droplet images. A rectangular region of interest (ROI) extending from 1 foot vertically below the nozzle end up to 2 feet below the nozzle end was selected to ensure complete spray atomization, and all droplet images within this ROI were analyzed using ImageJ Particle Analysis algorithm to output a list Feret diameters ($d_f$) of all droplet images irrespective of their size or circularity.

The droplet Feret diameters extracted from the full fan spray images included the effects of instrumental artifact viz motion blur due to camera limitations and intrinsic material characteristics of the sprayed test solutions. The Feret diameters $d_f$ were converted to actual droplet diameters D using the appropriate sample correction factor $C_s$ from table 3.

The corrected diameters of all droplets detected and measured in the ROI of each binary spray image were statistically binned in 400 size-bins from 5 microns to 2000 microns with a 5 micron increment in the bin size to obtain drop-size frequency and cumulative % for each image. Non-linear curve fitting algorithm was implemented on the drop-size frequency vs. drop-size data to obtain the frequency distribution curve illustrated in FIG. 5. The drop-size vs. cumulative % data from the statistical binning was fitted to Equation 5, which is described above, to generate the Cumulative % curve with at least 95% goodness of fit. From the fitted % Cumulative curve thus obtained spray drop-size distribution parameters $Dv_{0.1}$, $Dv_{0.5}$ (VMD), $Dv_{0.9}$, % fines<105u (occasionally termed as driftable fines), 141u, 150u, 200u, 210u, 400u, and 730u were extracted. The average of these values from 12-15 images per sample was reported as the drop-size distribution parameters for the sample along with spray drop-size data obtained for identical samples under identical nozzle and pressure conditions from a wind tunnel (Table 4)

FIGS. 4A-4D shows the representative background-corrected and digitally processed images of full spray fan of test sample solutions actuated through a Flat-fan XR11004 nozzle at 40 PSI pressure. The rectangular box 40 on each image represents the area over which drop detection and drop-size extraction was carried out on the processed spray fan images through digital image processing, data extraction, and statistical calculation algorithms described herein. The ROI was chosen to be 1 foot vertically below the spray nozzle to ensure complete atomization of the spray sheet. The ROI spanned over an area of approximately 1 foot×3.5 feet

TABLE 4

Comparison of spray drop-size data obtained from full-fan optical spray image analysis and wind tunnel

| Spray Parameters | Sample: Water | Herbicide | Commercial 01 in Herbicide | Agrimer M-DCA in Herbicide |
|---|---|---|---|---|
| $Dv_{0.1}$ (μ) | 104 (±0.54%)<br>*105* | 97 (±2.0%)<br>*95* | 138 (±1.8%)<br>*136* | 154 (±1.9%)<br>*141* |
| $Dv_{0.5}$ (μ) | 268 (±3.4%)<br>*243* | 227 (±2.7%)<br>*223* | 287 (±6.6%)<br>*266* | 337 (±5.9%)<br>*271* |
| $Dv_{0.9}$ (μ) | 632 (±4.4%)<br>*417* | 531 (±3.9%)<br>*406* | 596 (±14.6%)<br>*422* | 740 (±10.8%)<br>*423* |
| % < 105 μ (Driftable fines) | 10.11 (±1.1%)<br>*10.10* | 11.93 (±4.4%)<br>*12.56* | 4.67 (±4.7%)<br>*4.49* | 3.72 (±2.4%)<br>*4.07* |

Numbers in italics were obtained from wind tunnel.

For comparison to the drop size distribution obtained using the disclosed system and methods, wind tunnel evaluation of test spray solutions for drop size characterization was carried out in the low-speed wind tunnel at University of Nebraska, Lincoln. Spray solutions were actuated horizontally with compressed air at a pressure of 40 psi through TEEJET XR11004 nozzle mounted on a linear actuator with a vertical traverse speed of 2.4 inches/s under continuous laminar 15 miles/h airflow coaxial with the plane of the spray. Spray drop-size data was acquired and analyzed with Sympatec Helos KR particle size analyzer equipped with a R7 lens with the laser ray intersecting the spray at a point 12 inches directly in front of the nozzle. The data were analyzed using a mixed model ANOVA (PROC MIXED) with Replication set as random in SAS 9.2. The mean separation were conducted at the α=0.05 level using Tukey adjustment. The results of the wind tunnel testing are provided in italics in Table 4 above.

A notable difference exists between the current method in discussion and previously published techniques for spray drop size and dropsize distribution calculations from optical images of sprays. Previous techniques mostly relied heavily on and emphasized capturing the most accurate possible images of spray droplets. Thus, these techniques almost invariably used a macro or telescopic lens for their camera or imaging equipment that severely restricted the field of view (FOV) capturing only a few (2-100) droplets per image. Furthermore, complicated image processing and focus correcting algorithms were implemented in most of the published techniques to correct for overlapping drops, out of focus drops, and non-spherical drop shapes. Transmission or backlit imaging techniques were also severely restricted to the point of measurement in a spray plume that only offered low spray plume density and good line of sight and suitable transmission intensity of the back-light.

In contrast, the current method was developed to deliberately maintain a general focus over a much larger field of view (FOV) at a much shallower depth of field (DOF) to capture spray droplets over a larger area, which permits use of this technique as a simple, easy-to-operate, field-deployable method for characterizing a spray without needing complicated image correction algorithms. Under the current method of spray full-fan image analysis, approximately 90000 individual drops were detected, analyzed for their drop-sizes and for dropsize distribution statistics within the selected ROI for each full-fan spray image. Thus the minute inaccuracies in determining size of each individual drops arising from the wide angle focus and narrow depth of field for the current technique were largely compensated for by averaging and statistical binning of drop sizes over a much larger dataset (90000 data points per image). This is evident from the comparison of the characteristic spray dropsize distribution data obtained from the current imaging method (Table 4) and from wind-tunnel experiments using same spray samples under similar nozzle and pressure conditions.

Although the spray images using the disclosed systems and methods were made for sprays actuated from a static nozzle with no concurrent wind flow in the direction of the spray, close agreement was observed between drop size data obtained from the disclosed imaging methods and drop size data obtained from the wind tunnel experiment. This suggested that the current image analysis systems and methods are not effected by problems arising in spray dropsize distribution calculations caused by over-counting and multiple counting of rapidly decelerating finer droplets that recirculate back in to the spray stream. This was generally achieved in wind tunnel evaluations using a concurrent and laminar 15 miles/hr wind flow parallel to the spray plane and in direction of propagation of the spray to render all droplets equal terminal velocity and remove decelerating fine droplets from the laser beam of the laser diffraction particle analyzer once counted. In the current optical spray image analysis methods, over-counting of fine droplets was prevented by virtue of images being made at very high shutter speeds restricting effective exposure of the field of view to several thousandths of a second.

The innovative digital optical imaging systems and image analysis methods disclosed herein can be used for multi-characterization of agricultural sprays, as well as sprays in other industries. This image acquisition and analysis techniques described herein enables precise drop-size extraction and analysis for the entire spray plume emerging from a single or an array of multiple nozzles at once, which is one distinctive advantage of the disclosed optical imaging systems and image analysis methods over other conventional non-intrusive spray drop-size analysis techniques. Other benefits of the disclosed optical imaging systems and methods can include, but are not limited to, small equipment footprint, low setup cost, ease of use, system ruggedness, and data accuracy, among others. These attributes make the disclosed systems and methods a highly mobile platform that can be used as a field-deployable system on wide variety of mobile or static spraying rigs for real-time spray data acquisition, analysis and recording during actual spray applications.

Although the invention is shown and described with respect to certain embodiments, it is obvious that modifications will occur to those skilled in the art upon reading and understanding the specification, and the present invention includes all such modifications.

What is claimed is:

1. A system for characterizing a spray, the system comprising:
    an imaging system capable of capturing optical images of up to a full fan of the spray; and
    a processor for processing and analyzing data from the imaging system, the processor having a first algorithm and a second algorithm thereon;
    wherein the first algorithm is an image processing and analysis algorithm that generates a feedback correction factor through extraction of a plurality of spray characteristics from one or more optical images of the spray, wherein the spray characteristics are one or more of a spray sheet length, sheet break-up mechanism, or spray front velocity;
    wherein the second algorithm is an image processing and analysis algorithm that identifies a plurality of spray droplets from an optical image of a spray fan, extracts a drop-size for each of the plurality of spray droplets, and develops a drop-size distribution from the optical image; and
    wherein the feedback correction factor is defined as a product of an average spray front velocity of a reference spray, a duration of imaging determined by a shutter speed of the image acquisition device or a flash duration of the illumination source, and a spray sheet length ratio, wherein the spray sheet length ratio is defined as a spray sheet length of the spray divided by a sheet length of a reference spray obtained under similar spraying conditions.

2. The system of claim 1 wherein the imaging system comprises:
    an image acquisition device;
    one or more illumination sources;
    an optional background; and
    a spray system having a spray nozzle fluidly coupled to a pressurized spray fluid container, the nozzle being oriented to produce a spray along one or more planes.

3. The system of claim 2 wherein the image acquisition device is a digital camera, a Single Lens Reflex (SLR) digital camera, or a mirrorless digital SLR camera employing a CCD-type or a CMOS-type image sensor, wherein the image acquisition device has a shutter speed faster than 1/100 seconds.

4. The system of claim 2 wherein the image acquisition device operates in a stand-alone mode or is in communication with the processor through a wired, Ethernet, or wireless connection.

5. The system of claim 2 wherein the one or more illumination sources includes one or more continuous or pulsed illumination sources, wherein the one or more illumination sources is one of natural light, incandescent light, fluorescent light, LED light, or short duration high intensity flash capable of generating 5-500 µs duration light pulses, wherein the one or more illumination sources are remotely controlled by or directly linked to the camera or the processor.

6. The system of claim 2 wherein the one or more illuminating sources and the image acquisition device are positioned on the same side of the spray.

7. The system of claim 2 wherein the processor includes software instructions for acquiring image data from the image acquisition device and/or processing the image data.

8. The system of claim 2 wherein the optional background is a dark non-reflective absorbent background.

9. The system of claim 1 wherein the processor is a computing device that is one or more of a desktop computer, laptop computer, electronic tablet, smartphone, other mobile device, or custom control console, wherein the processor is in communication with the imaging system and is capable of controlling image acquisition by the imaging system and consequent image processing.

10. The system of claim 1 wherein the spray fan of the optical image is the full fan of the spray.

11. The system of claim 1 wherein the spray fan of the optical image is a partial fan of the spray.

* * * * *